United States Patent [19]

Fujii et al.

[11] Patent Number: 4,648,650

[45] Date of Patent: Mar. 10, 1987

[54] BODY FOR TWO-WHEELED OR THREE-WHEELED VEHICLE

[75] Inventors: Takayuki Fujii, Ooi; Masayoshi Baba, Urawa, both of Japan

[73] Assignee: Honda Giken Kogyo Kabushiki Kaisha, Shibuya, Japan

[21] Appl. No.: 743,282

[22] Filed: Jun. 11, 1985

Related U.S. Application Data

[63] Continuation of Ser. No. 454,654, Dec. 30, 1982, abandoned.

[30] Foreign Application Priority Data

Jan. 7, 1982 [JP] Japan ..................................... 57-1130

[51] Int. Cl.[4] .......................... B62D 25/00; B62J 7/04; B62J 17/06; B60R 19/02
[52] U.S. Cl. .................................... 296/203; 296/37.1; 296/78.1; 180/216; 180/219; 293/105
[58] Field of Search ................. 180/210, 218, 219, 78; 296/78.1, 185, 188, 31 P, 31 R, 193, 194, 187, 203, 37.1; 293/105

[56] References Cited

U.S. PATENT DOCUMENTS

| D. 150,571 | 8/1948 | Henrichsen | 296/185 |
|---|---|---|---|
| 2,589,644 | 3/1952 | Thostenson | 180/219 |
| 2,721,745 | 10/1955 | Torre | 180/219 |
| 3,024,060 | 3/1962 | Barenyi | 296/31 P |
| 3,047,331 | 7/1962 | Porsche et al. | 296/37.16 |
| 3,578,782 | 5/1971 | Miyoshi | 180/78 |
| 3,688,856 | 9/1972 | Boehm et al. | 296/31 P |
| 4,087,110 | 5/1978 | Vetter | 296/78.1 |
| 4,355,841 | 10/1982 | Ghidella et al. | 296/185 |
| 4,372,602 | 2/1983 | Tsuchiya et al. | 296/78.1 |
| 4,453,763 | 6/1984 | Richards | 296/185 |
| 4,460,057 | 7/1984 | Kohyama | 180/210 |
| 4,462,481 | 7/1984 | Kawasaki et al. | 180/210 |
| 4,462,632 | 7/1984 | Grassl, Sr. | 296/187 |
| 4,487,283 | 9/1982 | Suzuki et al. | 280/289 S |
| 4,529,242 | 7/1985 | Watanabe et al. | 296/78.1 |

FOREIGN PATENT DOCUMENTS

| 1138186 | 1/1957 | France | 180/210 |
|---|---|---|---|
| 1175543 | 11/1958 | France | 296/78.1 |
| 2305335 | 11/1976 | France | 296/188 |

OTHER PUBLICATIONS

Wills, Fiberglass Auto Body Construction, 1953, p. 68.

Primary Examiner—Robert B. Reeves
Assistant Examiner—Dennis H. Pedder
Attorney, Agent, or Firm—Armstrong, Nikaido, Marmelstein & Kubovcik

[57] ABSTRACT

A vehicle body adapted for use in a two-wheeled or three-wheeled vehicle, such as a scooter, in which a front body, with an edge frame portion of inverted vertical U-shape, for covering the front surface of a main body and is formed of synthetic resin formed integrally with a front bumper extending horizontally with a U-shaped cross section and is integrally coupled with the main body formed of a framework of a metal material such as steel material.

7 Claims, 6 Drawing Figures

BODY FOR TWO-WHEELED OR THREE-WHEELED VEHICLE

This application is a continuation of application Ser. No. 454,654 filed Dec. 30, 1982, now abandoned.

BACKGROUND OF THE INVENTION

1. Field of the Invention

This invention relates to a vehicle body adapted for a two-wheeled or three-wheeled vehicle and particularly for a scooter.

2. Description of the Prior Art

A vehicle body for a two-wheeled or three-wheeled vehicle is required to have high rigidity and strength so as not to be deformed or bent even if vibration or an impact is applied to the body. The body is also required to have high buffer and absorbing property against an impact and it is desirable to have a light weight as a whole. However, it was difficult to construct a body which satisfies all the above-mentioned requirements in a conventional two-wheeled or three-wheeled vehicle.

SUMMARY OF THE INVENTION

Accordingly, it is an object to provide a vehicle body for a two-wheeled or three-wheeled vehicle which can satisfy all the aforementioned requirements as a whole. This is accomplished by making a main vehicle body of a framework of metal to have high rigidity and strength and making a front vehicle body attached thereto of synthetic resin material to enhance impact absorption.

The above and other objects as well as advantageous features of the present invention will become apparent from the following description of the preferred embodiment taken in conjunction with the accompanying drawings.

DESCRIPTION OF THE PREFERRED EMBODIMENT

An embodiment of this invention exemplified in a two wheeled scooter will be described with reference to the accompanying drawings.

Figure 1:
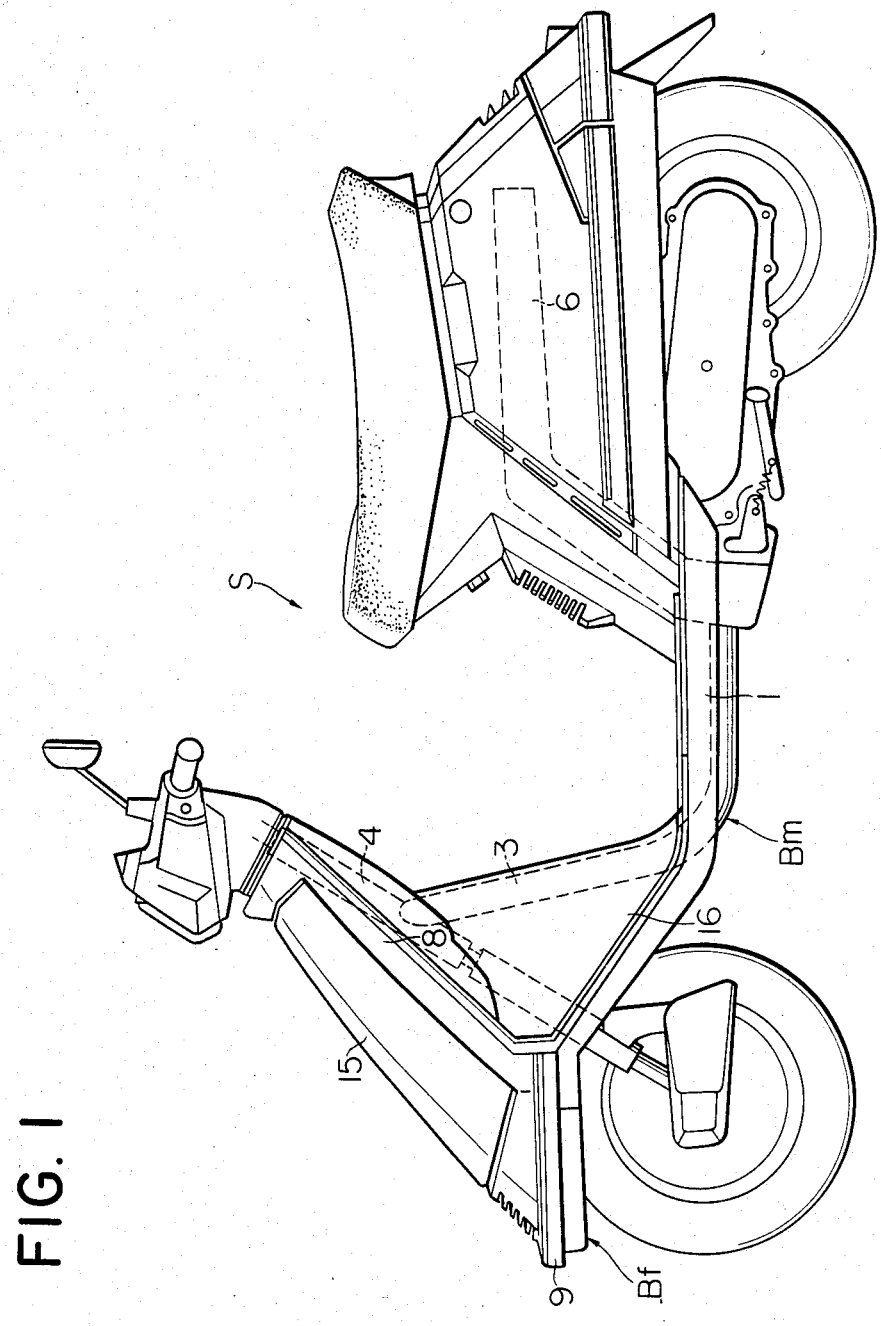
FIG. 1 is an entire side view of a scooter having a vehicle body according to the present invention.

A body of a scooter S shown entirely in FIG. 1 comprises a main body Bm, and a front body Bf which is integrally coupled to the front portion of the main body Bm. The concrete constructions of the components will be described in more detail.

Figure 2:
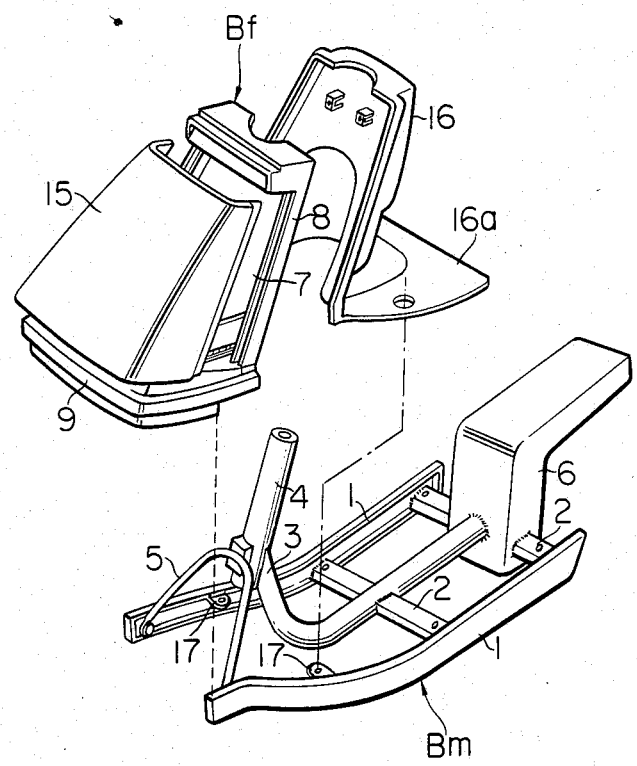
FIG. 2 is an exploded perspective view of the body of the invention.

The main body Bm is, as shown in FIG. 2, composed of a framework of metal material. Right and left longitudinal beams 1 and 1 which extend longitudinally in parallel with one another are coupled integrally through cross members 2 and 2. A down tube 3 which longitudinally passes between the pair of right and left beams 1 and 1 is coupled integrally with the right and left intermediate parts of the cross members 2 and 2. A head pipe 4 which extends elevationally is secured fixedly to the front end of the tube 3. The lower end of the pipe 4 and the front ends of the beams 1 and 1 are coupled through an inverted U-shaped reinforcing member 5. A gooseneck tail frame 6 is coupled to the coupling portion of the rear end of the tube 3 and to one cross member 2. All the components of the main body Bm are formed of metal and thus have high rigidity and strength as a whole.

The front body Bf is entirely formed of hard synthetic resin material, and comprises an integrally connected panel 7 which covers the front surface of the body Bm, and an upper portion of the front wheel an inverted vertical U-shaped edge frame portion 8 which forms upper edge as well as right and left side edges, and a front side portion or front bumper 9 disposed forwardly of the front wheel which extends in U shape in cross section with its rear side open and which is integrally formed forwardly at the lower edge of the edge frame portion 8.

Figure 3:
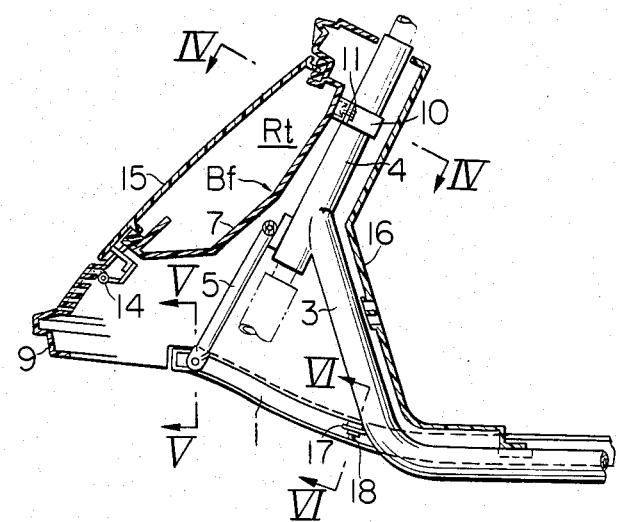
FIG. 3 is a longitudinal sectional side view of the front portion of the body of the invention.
Figure 4:
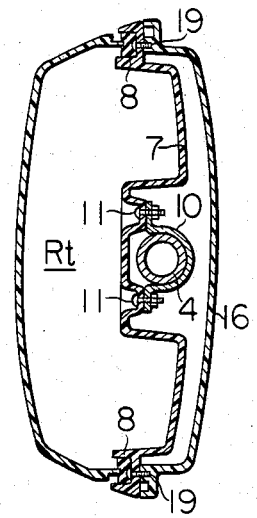
FIG. 4 is an enlarged lateral sectional view taken along the line IV—IV in FIG. 3.
Figure 5:
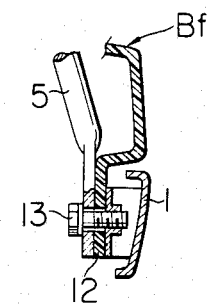
FIG. 5 is an enlarged longitudinal sectional view taken along the line V—V in FIG. 3.

As shown in FIGS. 3 and 4, the pipe 4 of the body Bm is fixedly secured at the center on the back surface of recessed panel 7 of the front body Bf adjacent the upper edge of the edge frame portion 8 through a holding piece 10 via clamping bolts 11. The right and left lower edges 12 of the body Bf are, as shown in FIG. 5, secured fixedly integrally with the right and left lower ends of the reinforcing member 5 between the front ends of the pair of the right and left beams 1 and 1 by clamping bolts 13 and 13 directly behind the right and left rear ends of the bumper 9. The securing portion is covered with the outer surfaces of the beams 1 and 1. In this manner, the front body Bf is rigidly secured to the front portion of the main body Bm.

At the front surface of the front body Bf is formed a trunk room Rt. The opening of the trunk room Rt is closed by a hard synthetic resin trunk cover 15 which is attached by a hinge 14 to the lower portion of the body Bf.

Figure 6:
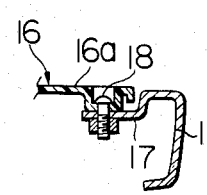
FIG. 6 is an enlarged sectional view taken along the line VI—VI in FIG. 3.

At the rear of the body Bf is arranged a synthetic resin leg shield 16 which covers the rear surfaces of the pipe 4 and the upper portions of the tube 3. This leg shield 16 is, as shown in FIG. 6, secured at the right and left lower sides 16a to brackets 17 and 17 integral with right and left beams 1 and 1 via clamping bolts 18 and 18. The front edge of the shield 16 contacts the rear edge of the edge frame 8 of the body Bf and is secured fixedly thereto by clamping bolts 19, 19, . . . .

In the embodiment described above, the body of the invention has been described in the case that the body is exemplified in a scooter. However, the body of the invention may also be applied to two-wheeled and three-wheeled vehicles within the spirit and scope of the present invention.

According to the present invention as described above, since the main body Bm of the vehicle is composed of a framework of metal material such as steel material, the entire body can have sufficient rigidity and strength via the main body Bm. Further, the front body Bf which is frequently impacted by external force is composed of synthetic resin material to cover the front surface of the main body Bm. The front bumper 9 is formed integrally with the front body Bf. Therefore, the impact force which is applied to the body can be effectively buffered and absorbed by the front body Bf which has excellent elasticity as compared with the main body Bm with the result that the impact force is hardly transmitted to the main body Bm, thereby eliminating the deformation and damage of the main body Bm.

Further, even if the front body Bf receives excessive external force and impact force and is thus scratched or damaged, only the front body Bf may be replaced. Accordingly, the reduction in the recovery cost can be obtained.

In addition, part of the vehicle body is formed of synthetic resin material which is lighter in weight than the metal material. Therefore, the total weight of the vehicle body can be reduced, thereby contributing to improvement in the performance of two-wheeled or three-wheeled vehicle.

Moreover, when a trunk room is formed at the front body and the opening of the trunk room is closed by the trunk cover of hard synthetic resin hinged to the lower portion of the front body, the impact force which is applied to the front body can be further buffered and absorbed by the buffering function of the trunk room.

While a preferred embodiment of the invention has been described, variations thereto will occur to those skilled in the art within the scope of the present inventive concept which is delineated by the appended claims.

What is claimed is:

1. A body for a vehicle having less than four wheels with one of the wheels being a front wheel, comprising:
   a main body formed of a framework of metal material; and
   a front body having a recessed panel, an edge frame portion of an inverted vertical U shape with a laterally extending upper edge, and a protruding front side portion serving as a front bumper extending horizontally and of U shape in cross section in plan view with a rear side thereof open, said front side portion being disposed forwardly of the front wheel at a front portion of said main body and being integrally formed with said panel and said edge frame portion;
   said front body being entirely formed of synthetic resin material and being integrally connected at lowermost rearward lateral portions thereof to said main body, said front body being further connected to said main body at a portion of said panel adjacent said upper edge of the edge frame portion,
   said front body providing a space forwardly of said panel, said space being closed by a cover attached to said front body to define a trunk room therein.

2. A body for a vehicle as defined in claim 1, wherein said cover is attached by being hinged to a lower portion of said front body.

3. A body for a vehicle as defined in claim 1, wherein said main body has a vertically extending head pipe and a pair of left and right beams extending longitudinally of the vehicle body at a position below said head pipe, said front body having left and right lower edges located rearwardly of the front side portion and fixedly secured to front ends of the pair of the left and right beams, respectively, these lower edges being further connected to a lower part of said head pipe via a reinforcing member and said panel being fixed to an upper part of said head pipe.

4. A body for a vehicle having less than four wheels with one of the wheels being a front wheel, comprising:
   a main body formed of a framework of metal material having a head pipe, a pair of longitudinal beams and a reinforcing member adapted to couple said head pipe with said pair of beams;
   a front body formed of synthetic resin material and having an edge frame portion of an inverted U shape with a laterally extending upper edge and lower left and right end parts, a front side portion serving as a front bumper and formed into U shape in plan view with a rear side thereof open to have a rear left and right end parts thereof formed integrally with said lower left and right end parts of said edge frame portion, respectively, and a panel integrally connected to said edge frame portion and said front side portion so as to close an opening defined by cooperation of said edge frame portion and said front side portion; and
   a trunk room defined by said front body forwardly of said panel, said trunk room being adapted to be closed by a cover attached to said front body;
   wherein said front body is mounted and fixed to said main body by said panel being connected to an upper part of said head pipe and further by lowermost and rearward side parts of said front body, adjacent said end parts of the edge frame portion and the front side portions, being connected to front end portions of said pair of beams, and wherein said lowermost and rearward side parts of the front body are clamped between said reinforcing member and said pair of beams, respectively.

5. A body for a vehicle as defined in claim 1, further comprising a leg shield member positioned rearwardly of said edge frame portion and detachably connected thereto.

6. A body for a vehicle as defined in claim 3 further comprising a leg shield member detachably connected to said edge frame portion rearwardly thereof to enclose said head pipe between said leg shield member and said panel.

7. A body for a vehicle as defined in claim 4 further comprising a leg shield member fixedly secured to said edge frame member at a rear edge thereof to cover said head pipe.

* * * * *